United States Patent [19]

Strauff

[11] 4,052,233
[45] Oct. 4, 1977

[54] METHOD FOR GAS-AND FLUID-TIGHT SEALING OF BOREHOLES WHICH ARE THREADLESS AND UNDER PRESSURE, AND ARE MOUNTED IN A HARDENABLE RAW MATERIAL

[75] Inventor: Gunther Strauff, Kaarst, Germany

[73] Assignee: Langen & Company, Dusseldorf, Germany

[21] Appl. No.: 661,826

[22] Filed: Feb. 26, 1976

[30] Foreign Application Priority Data

Feb. 26, 1975  Germany .............................. 2508269

[51] Int. Cl.² .......................... C21D 1/74; C21D 7/02
[52] U.S. Cl. .................................... 148/12.1; 148/15.5; 148/16.5; 148/16.6; 148/18; 148/19

[58] Field of Search ..................... 148/16.6, 15.5, 16.5, 148/12.1, 18, 19, 14

[56] References Cited

U.S. PATENT DOCUMENTS 1,918,895  7/1933  Bersey et al. ........................ 148/16.6

Primary Examiner—R. Dean
Attorney, Agent, or Firm—Holman & Stern

[57] ABSTRACT

A method of sealing non-threaded boreholes with a preferably spherical sealing member comprising pressing the sealing member into the borehole in an unhardened raw material hardenable by nitridation, wedging the lip of the borehole and hardening the material by nitridation at a temperature at which at least some of the initial stress generated by the pressing is retained.

4 Claims, 3 Drawing Figures

METHOD FOR GAS-AND FLUID-TIGHT SEALING OF BOREHOLES WHICH ARE THREADLESS AND UNDER PRESSURE, AND ARE MOUNTED IN A HARDENABLE RAW MATERIAL

BACKGROUND OF THE INVENTION

The present invention concerns a method for a gas- and fluid-tight sealing of non-threaded boreholes which are under pressure, and are situated in a hardenable raw material, with the aid of a sealing member, especially of a spherical means which is being pressed into a borehole.

It is known in the prior art to utilize steel balls for the purpose of sealing non-threaded boreholes in housings of hydraulic or pneumatic devices. The housings have consisted of a building steel or a gray (cast) iron in most cases, so that when said steel balls were pressed into the boreholes few difficulties developed. In the use of these types of raw materials, the possibility of wedging over the boreholes to some extent at their outer end portions was utilized so that the ball could more positively be prevented from moving outwardly. However, certain difficulties developed when housing comprising hardenable raw materials were used, since the pushing-in of a ball after the hardening process in itself became difficult, and, additionally, there existed the danger of splintering-off or flaking-off the edges of the hardened surfaces. An effort has been made for removing this disadvantage by using the case-hardened steels as work material and by covering certain of the boreholes sections before the insertion. In this way, one obtained soft borehole sections, however, one was forced to accept also the increased costs and expenses for the covering, in addition to the costs for the comparatively expensive case-hardened steels.

OBJECTS AND SUMMARY OF THE INVENTION

It is therefore the object of the instant invention to avoid the aforementioned disadvantages and to construct the above-described method in such a manner so that without a substantial additional expense a simple, permanent and safe sealing results. The instant method should comply with the common practice in the industry. Additionally, it should become possible to obtain, when required, the desired wedging over to prevent a pushing out of the spherical closing means.

The solution of this problem is inventively accomplished in that the raw material is nitrogen-hardenable, the sealing member is pressed into the borehole in an initially non-hardened raw material, and then a hardening by nitridation follows under a temperaature in which the initial stress which develops between the borehole and the sealing member by means of inward-pressing, will at least partially be retained.

The advantages of the inventive method is in the fact that no coverings are necessary anymore, and that a volume-enlargement takes place in the surface area, even though minute, which will render difficult the forcing out of the sealing member.

BRIEF DESCRIPTION OF THE DRAWINGS

The instant inventive method is explained in greater detail by means of the illustrations, wherein.

DETAILED DESCRIPTION OF THE INVENTION

Figure 1:
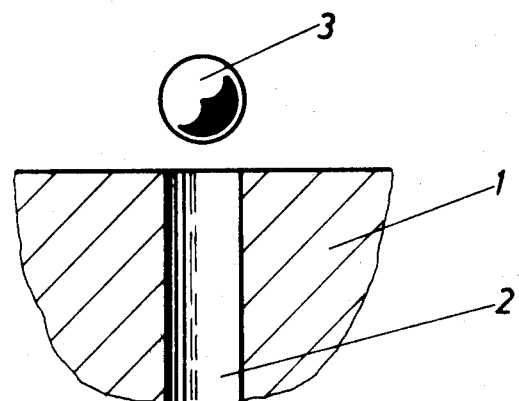
FIG. 1 shows a portion of a housing provided with a borehole as well as a spherical means before the pressing of the same into the borehole.
Figure 2:
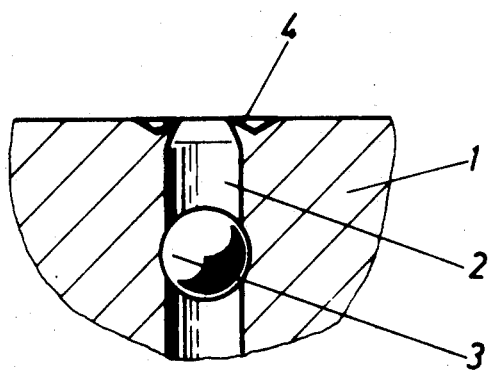
FIG. 2 shows the spherical means after having been pressed into the borehole.
Figure 3:
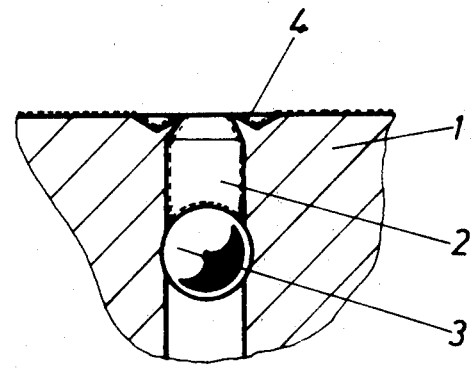
FIG. 3 shows the volume-increase in the hardened surface areas.

A cylindrical borehole 2 is provided in a housing 1, into which a spherical member (ball) 3, having a diameter which is to a very small extent larger than that of the borehole 2, is to be pressed. The excess measure of the diameter of the spherical means 3 is such that the wall of the borehole 2 will, in general, be elastically deformed. Since the ball 3 is hardened and the material of the housing 1 in contrast thereto is relatively soft, the borehole 2 is actually substantially deformed. As can be seen from FIG. 2, after the presssing in of the ball, the end portion of the borehole 2 is then deformed by means of wedging, or the like, whereby the housing material 4 is forced inwardly into the borehole 2, the diameter of which as a result is reduced and thus produces an increased quaranty against the ball 3 being forced out when placed under pressure. After this deformation, the housing 1 and ball 3 are subjected to a hardening by nitridation. The temperature used in generally between 500° and 600° C, however, for the purpose of speeding the hardening process, the use of higher temperatures is also possible. The temperature should in any case be selected so that the ball 3 obtains at least one portion of its hardness therefrom and that at least a certain portion of the initial stress between ball 3 and the borehole 2 is retained. It is known in the prior art that a small increase in the volume of the boundary layers takes place by means of the diffusion of nitrogen atoms into the steel-latice. This volume increase is shown in FIG. 3 by means of the broken line in a strongly enlarged dimension. Insofar as this volume increase takes place in the material surrounding the borehole 2, this causes a reduction of the diameter and represents thereby an additional quaranty against the popping out of the ball 3.

Under the expression "nitriding" should be understood in addition to a gas-nitriding with a nitrogen-containing gas and bath-nitriding in cyanide-baths also the carbo-nitriding, i.e., a combination of carburization and nitrogenization.

An example of an application of the present invention, in which it is necessary to produce the housing of a hydraulic valve out of the hardenable raw material, is a hydraulic servo steering system for motor vehicles where the valve housing is combined with a pinion into a single piece. Since the toothing of the pinion should have hardened surface areas and a hard core, and, as already mentioned above, the covering of the housing is connected with great expenditure, the instant invention method offers a simple and economical solution to the problem.

Of course, instead of the spherical sealing means, cylindrical or to some extent conically-shaped sealing stoppers may be pressed into the borehole.

What is claimed is:

1. A method for gas- and fluid-tight sealing of non-threaded boreholes in a nitridation hardenable raw material comprising the steps of:

press fitting a hardened sealing member into a borehole in an unhardened raw material hardenable by nitridation; and hardening said raw material by nitridation at a temperature in which the initial stress which is developed by the pressing is partially retained.

2. The method of claim 1 comprising the additional step of wedging the lip of said borehole prior to hardening.

3. The method of claim 1 wherein the temperature is between 500° and 600° C.

4. The method of claim 2 wherein the temperature is between 500° and 600° C.

* * * * *